(No Model.)

H. C. PHILLIPS.
BICYCLE STAND OR HOLDER.

No. 574,629. Patented Jan. 5, 1897.

Witnesses:
G. Willard Rich.
Wallace Murdock

Inventor
Harry C. Phillips
by Church & Church
his Attys

UNITED STATES PATENT OFFICE.

HARRY C. PHILLIPS, OF ROCHESTER, NEW YORK, ASSIGNOR TO THE ROCHESTER BICYCLE COMBINATION HOLDER COMPANY, OF SAME PLACE.

BICYCLE STAND OR HOLDER.

SPECIFICATION forming part of Letters Patent No. 574,629, dated January 5, 1897.

Application filed September 11, 1895. Serial No. 562,145. (No model.)

*To all whom it may concern:*

Be it known that I, HARRY C. PHILLIPS, of Rochester, in the county of Monroe and State of New York, have invented certain new and useful Improvements in Bicycle Stands or Holders; and I do hereby declare the following to be a full, clear, and exact description of the same, reference being had to the accompanying drawings, forming a part of this specification, and to the reference-letters marked thereon.

My present invention has for its object to provide an improved bicycle stand or holder, particularly of that class shown in my pending application, Serial No. 555,309, filed July 8, 1895, in which are employed two members relatively adjustable, preferably pivoted, and engaging separated portions of a bicycle-frame and arranged to hold the bicycle on the stand; and to these and other ends it consists in certain improvements in construction and combinations of parts, all as will be hereinafter fully described, and the novel features pointed out in the claims at the end of this specification.

Figure 1:
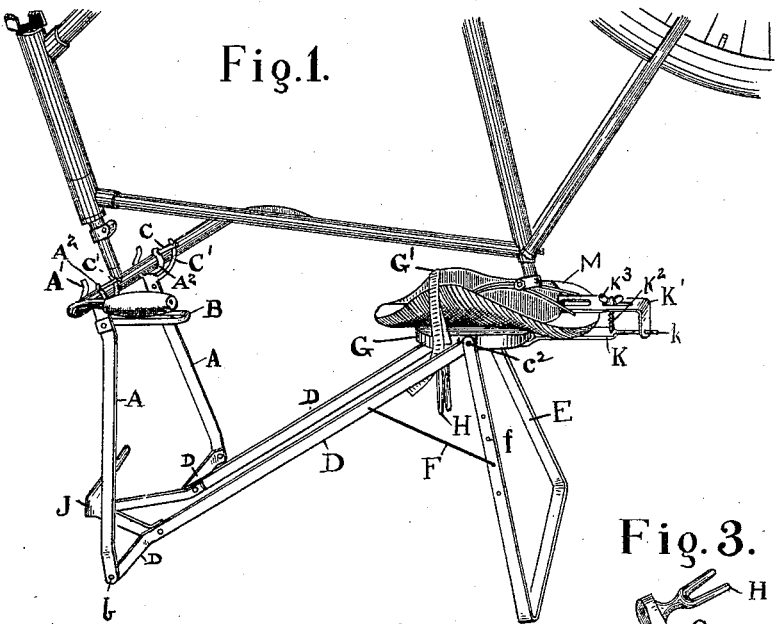
Figure 2:
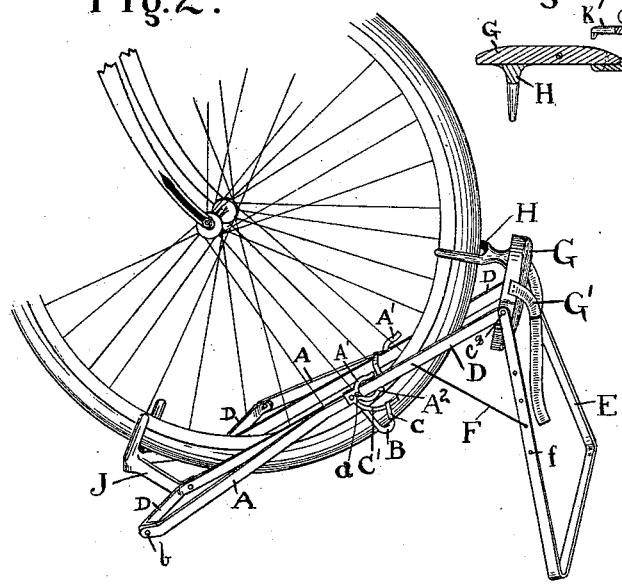
Figure 4:
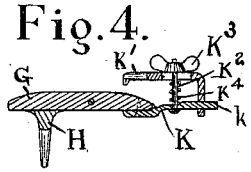
Figure 3:
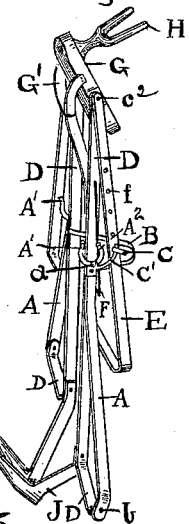
Figure 5:
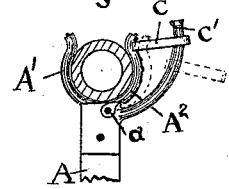

In the accompanying drawings, Figure 1 is a perspective view of a holder constructed in accordance with my present invention, showing a portion of a bicycle-frame thereon in position for cleaning or adjusting; Fig. 2, a similar view showing the position to which the parts are adjusted when the device is used as a rack; Fig. 3, a similar view showing the stand folded; Fig. 4, a sectional view of a saddle-holding clamp; Fig. 5, a detail view of the clamping device for holding the bicycle handle-bar.

Similar reference-letters in the several figures indicate similar parts.

The frame of the stand, which is preferably constructed of strap-iron, consists generally of two members or sections, one adapted to grasp and support the handle-bar or corresponding part of a bicycle and the other to engage or support the saddle or rear end of the machine, said members being preferably pivoted together to receive bicycles of different lengths.

The first-mentioned member, in the present embodiment of my invention, consists of the two side pieces A A, connected by a loop or U-shaped bracket B and having at their upper ends clamping devices for engaging the handle-bar, constructed, in the present instance, of stationary curved prongs or fingers A' and corresponding movable curved fingers or pins $A^2$, pivoted at $a$ to the side pieces A and adapted to be moved and clamped against the handle-bar when between them by means of a movable block C, having an aperture through which passes a curved pin C', secured to the side pieces A, as shown particularly in Fig. 5. These blocks or plates C are capable of being moved down upon the pins C' toward the pivots of the arms $A^2$, so that said arms may be moved toward the arms A' to grasp handle-bars of various sizes and clamp them firmly to the movable member.

The lower ends of the side pieces A are pivoted at $b$ to the end of the base-frame, composed of side bars D, extending upward diagonally and connected, preferably by a pivot $c^2$, with the leg or support E, preferably formed of a single piece of strap-iron, bent as shown. The parts D and E are connected by a hook or link F, pivoted to the part D and adapted to be engaged with one or the other of a series of holes $f$ in the side of the leg E, thereby adjusting the height of this member of the support.

It is not essential that the parts D and E be pivoted together, but I prefer this arrangement, as it enables the holder to be folded up, as shown particularly in Fig. 3, and also to permit the adjustment of the height.

Pivotally mounted upon the pin $c^2$, connecting the parts D and E, is a saddle-support G, adapted to turn freely upon said pivot and provided with a strap G' or other connecting device, adapted when the saddle of a bicycle rests upon said support to engage it and hold the machine firmly in position, said support being permitted to tilt to accommodate itself to the pitch or angle of the saddle. Upon the under side of the saddle-support G is a forked bracket or casting H, and connecting the forward portions of the strips D is a forked connecting-bracket J. These forks H and J and the connecting-bracket D are arranged to engage and support the wheel of a bicycle when the parts A are folded down to the position shown in Fig. 2, the holder then serving as a rack into which the machine can be placed by the operator to maintain it in vertical position when resting upon the floor.

In order that the rear saddle M of the bicycle may be clamped to the saddle-support G, if desired, I prefer to secure to the rear side of the latter a bracket K, carrying a movable jaw K' with a hook at its forward end, while its rear end projects downward and is provided with a perforation through which passes the guiding extension $k$ of the bracket K, a bolt $K^2$, having a thumb-nut $K^3$ and operating through a small slot formed in the clamping-jaw K', and a spring $K^4$, serving to lift said jaw and hold it in engagement with the under side of the thumb-nut, as shown in Figs. 1 and 4. From this construction it will be seen that the saddle can be clamped to the saddle-support and the clamp adjusted vertically and longitudinally for saddles of various lengths and heights. This clamping device is desirable, but is not at all essential to the operation of the support.

The manner of using the device will be apparent from an inspection of Figs. 1 and 2, the member composed of the strips A A being capable of movement on the pivots $b$ to accommodate the device to different lengths of frame and the adjustment of the parts D and E permitting the adjustment for height. When the bicycle-frame is longer or shorter than the distance between the pivots $a$ and the saddle-support G, the weight of the bicycle serves to clamp it to the holder, while the movable clamping devices $A^2 A^2$ may be tightened and prevent any lateral movement in the holder.

The device is simple, performs the functions of both a stand and rack or holder, is adjustable for different lengths of machines, and the parts are so arranged that the weight of the machine locks it to the stand, and when not in use the holder can be compactly folded, as in Fig. 3.

It will be understood that other forms of clamping devices could be used on the upper ends of the member A for engaging the handle-bars, and though I prefer the ones shown, on account of simplicity, I do not wish to be confined to this.

I claim as my invention—

1. In a bicycle-holder, the combination with the base-frame, and a saddle-support, of the upwardly-extending movable member pivoted below its upper end to the frame and having devices at its upper end for engaging the handle-bar of a bicycle, said member being movable on its pivot and held from movement by the bicycle supported upon it, and a device on the saddle-support for engaging a saddle and preventing the movement of the latter in the plane of movement of the end of the movable member, whereby the bicycle will be locked to the holder by its weight, substantially as described.

2. In a bicycle-holder, the combination with the collapsible base-frame composed of the two parts pivoted together and a saddle-support thereon, of the upwardly-extending movable member pivoted below its upper end to the frame and having devices, as yokes, at its upper free end for engaging the handle-bar of a bicycle, said member being movable on its pivot and held from movement by the bicycle supported upon it, and a device on the saddle-support for engaging a saddle and preventing the movement of the latter in the plane of movement of the end of the movable member, whereby the bicycle will be locked to the holder by its weight, substantially as described.

3. In a bicycle-holder, the combination with the base-frame composed of the two parts adjustably connected and a saddle-support, of the upwardly-extending movable member pivoted to said frame below its upper end, said member being movable on its pivot, and being held from movement by the bicycle supported upon it, and having a clamping device on its free end for positively engaging and holding a bicycle handle-bar, and a device on the saddle-support for engaging a bicycle-saddle and preventing its movement in the plane of the movement of the end of the movable member, whereby the bicycle will be locked to the holder by its weight, substantially as described.

4. In a bicycle-holder, the combination with the base-frame composed of the parts D and E pivoted together, the detachable connection between them, and the bracket J, of the pivoted member A, A, the forked bracket B, and the securing devices arranged on the upper end of the pivoted member and on the base-frame for positively engaging separated parts of a bicycle-frame and preventing the movement of the movable member, substantially as described.

5. In a bicycle-holder, the combination with the base-frame composed of the parts D and E pivoted together, a locking device for securing them, the pivoted saddle-support, the forked bracket thereon, and the bracket J, of the pivoted member A, A, the forked bracket B, and clamping devices on the end of the pivoted member, substantially as described.

6. In a bicycle-holder, and as a means for clamping the handle-bar thereto, the combination of an arm or support, the stationary curved fingers, the movable coöperating curved fingers, the guide-pins C' and the movable blocks C, substantially as described.

7. In a bicycle-holder, the combination with the frame, a saddle-support thereon, and the pivoted member having handle-attaching devices, of the saddle-clamp on the saddle-support having the downwardly-extending hook for engaging the under side of the saddle, and adjustable vertically and also longitudinally of the support to secure the saddle thereto, substantially as described.

8. In a bicycle-holder, the combination with the base-frame and the movable member pivoted below its upper end to the frame, of a saddle-support, and a device thereon for engaging a bicycle-saddle and preventing its movement in the plane of movement of the free end of the movable member, and devices, as fingers, for engaging a bicycle handle-bar, said support and fingers being arranged upon the frame and movable member, and adjustable toward and from each other by the movement of the member on its pivot and said member being held from movement on its pivot by the bicycle supported upon it, substantially as described.

9. In a bicycle-holder, the combination with the frame, and a saddle-support, of the bracket secured to the support, the vertically and longitudinally adjustable clamp-arm on the bracket and the clamping-bolt, substantially as described.

HARRY C. PHILLIPS.

Witnesses:
F. F. CHURCH,
G. A. RODA.